United States Patent [19]

Schieltz

[11] 4,456,957

[45] Jun. 26, 1984

[54] APPARATUS USING A DECISION TABLE FOR ROUTING DATA AMONG TERMINALS AND A HOST SYSTEM

[75] Inventor: Steven W. Schieltz, Kettering, Ohio

[73] Assignee: NCR Corporation, Dayton, Ohio

[21] Appl. No.: 306,435

[22] Filed: Sep. 28, 1981

[51] Int. Cl.³ .......................... G06F 3/04; G06F 9/06
[52] U.S. Cl. ...................................... 364/200; 370/92
[58] Field of Search ....... 364/200 MS FILE, 900 MS FILE;
370/92, 89; 340/825.52, 825.1; 235/379

[56] References Cited

U.S. PATENT DOCUMENTS

| | | | |
|---|---|---|---|
| 3,544,769 | 12/1970 | Hedin | 235/379 |
| 3,632,881 | 1/1972 | Graham et al. | 370/89 |
| 3,680,056 | 7/1972 | Kropfl | 364/900 |
| 3,866,175 | 2/1975 | Seifert, Jr. et al. | 340/825.1 |
| 3,956,615 | 5/1976 | Anderson et al. | 235/379 |
| 4,009,468 | 2/1977 | Calcagno et al. | 340/825.02 |
| 4,246,637 | 1/1981 | Brown et al. | 364/200 |

OTHER PUBLICATIONS

*Computer Dictionary and Handbook*, Sippl and Sippl, Howard W. Sams Co. Inc., Second Edition, 1972, pp. 104 and 255.

Primary Examiner—Harvey E. Springborn
Attorney, Agent, or Firm—J. T. Cavender; Albert L. Sessler, Jr.; Elmer Wargo

[57] ABSTRACT

A router module controls interfaces to (a) terminals, (b) communications to a host system, and (c) a permanent storage device like a digital cassette. The router module utilizes routing logic including a decision table to effect the routing through the interfaces named. The terminals include data entry terminals and a printer module and the router module enables several data entry terminals to utilize the printer module. The router module is located on a substrate which can be mounted in one of the data entry terminals to utilize the associated power supply.

5 Claims, 5 Drawing Figures

APPARATUS USING A DECISION TABLE FOR ROUTING DATA AMONG TERMINALS AND A HOST SYSTEM

BACKGROUND OF THE INVENTION

This invention relates to an apparatus for routing data among terminals and a host computer system.

In certain environments such as banking or retailing, for example, it is desirable to share certain peripherals with a group of terminals. For example, in an effort to reduce the cost of small banking systems, it was desirable to provide one printing peripheral or module for several financial terminals. This is especially true for small bank branches. A common method of providing one printer for several financial terminals was to provide a mini-computer system which provided the communications interfaces among the several financial terminals. The mini-computer system was housed in a separate cabinet, requiring its own power supply and had a random access memory (RAM) which had to be programmed. This necessitated a system analyst at each bank to develop the necessary software which was unique for each bank.

SUMMARY OF THE INVENTION

Some of the advantages of the router module of this invention are:

1. It provides a low-cost communications connection in environments in which the number of terminals or peripheral devices is approximately 12 or less.

2. It has the capability of being attached to a variety of communications protocols.

3. It provides message routing capabilities among a group of terminals to enable several terminals to share a peripheral device such as a printer.

4. It provides an interface to enable a data recorder such as a digital cassette recorder to be attached at a point within the system for data capture, program load, program dump, and data reentry.

DETAILED DESCRIPTION OF THE INVENTION

Figure 1:
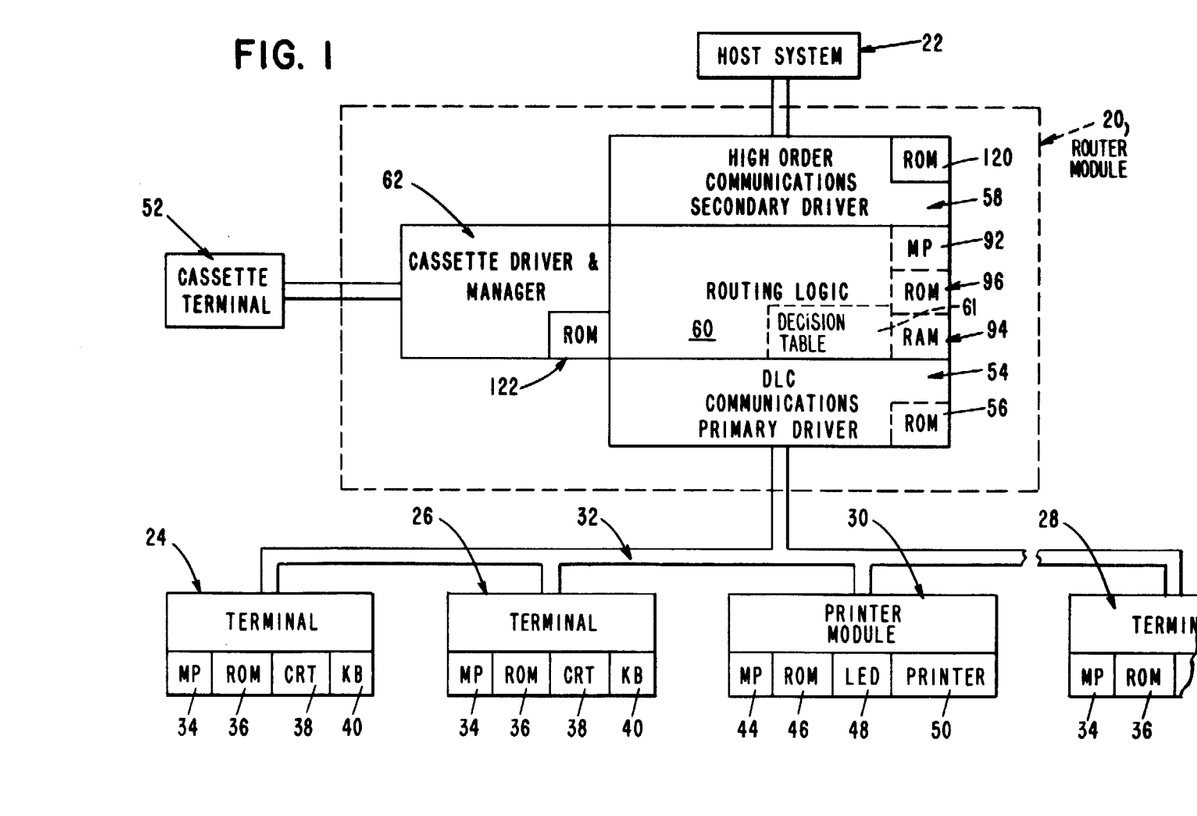
FIG. 1 is a block diagram showing an environment in which the router module of this invention may be used.

FIG. 1 is a block diagram showing the router module of this invention which is shown within a dashed rectangle and is designated generally as 20. To illustrate the invention, the router module 20 is shown in a banking environment although its use may be extended to other environments. Those items which are designated as conventional hereinafter or those which have part number designations such as the NCR 8250 and the Intel 8251 are those which are available to the general public as of the filing date of this application.

In the banking environment shown, the router module 20 (FIG. 1) is coupled to a host system 22, which in the embodiment described, could be a central computer system for the associated bank. The host system 22 may be computer systems as, for example, the NCR 8250, the NCR 8270, the NCR 5094 and the NCR Criterion Series of computer systems which are manufactured by NCR Corporation of Dayton, Ohio.

The router module 20 (FIG. 1) is also coupled to a plurality of terminals such as terminals 24, 26, and 28, and a printer module 30 via a bus 32. The terminals 24, 26, and 28 are identical and conventional, and are shown only in partial diagrammatic form; each such terminal includes a microprocessor (MP) 34, a memory system such as a read only memory (ROM) 36, a display unit such as a cathode ray tube (CRT) 38 and a data entry means such as a keyboard (KB) 40. The terminals like 24, 26, and 28 may be, for example, NCR 2262 Financial Teller Terminals which are manufactured by NCR Corporation of Dayton, Ohio. The printer module 30 is conventional and includes a MP 44, a ROM 46, a display such as the light-emitting diode type (LED) 48 and a printer 50 for printing on record media such as ledger cards, passbooks, and the like. The printer module 30 may be, for example, a NCR 2564-0403 Passbook Printer which is manufactured by NCR Corporation of Dayton, Ohio.

The router module 20 (FIG. 1) is also coupled to a conventional cassette terminal 52 which is used, for example, for data capture, program load, program dump, and re-entry functions.

The router module 20 (FIG. 1) includes a Data Link Communications (DLC) primary driver 54 which includes a memory device such as a ROM 56. The primary driver 54 is conventional and includes the serial interface 106 shown in FIG. 5. The interface 106 may be an NCR 006-008069 DLC Communication Integrated Circuit which is manufactured by and is available from NCR Corporation, Dayton, Ohio "or an Intel 8251 Integrated Circuit." The primary driver 54 is used to transfer information from the terminals such as 24, 26, 28, etc. to the host system 22 via the communications secondary driver 58 and the routing logic 60.

The secondary driver 58 (FIG. 1) essentially provides a handshaking function between the host system 22 and the router module 20. The secondary driver 58 is conventional and includes the serial interface 104 shown in FIG. 5. The interface 104 may be an Intel 8251 Integrated Circuit. The 8251 is a Universal Synchronous-/Asynchronous Receiver/Transmitter (USART) chip designed for data communications in microcomputer systems. The 8251 chip is manufactured by Intel Corporation. The driver 58 can be utilized with a number of different protocols, such as International Standards Organization (ISO), Binary-Synchronous (Bi-Sync), Data Link Control-Common Carrier (DLC-CC) and Data Link Communication (DLC). The ISO protocol is not complete in itself and is generally modified by the company using it. For example, there may be a Burroughs ISO, an NCR ISO, etc. The ISO and Bi-Sync protocols are "character" protocols. The characters in these character protocols generally utilize the ASCII format. The DLC protocol is a bit-oriented system in which data is presented in the form of long strings of binary 1's and 0's as will be described hereinafter in relation to FIG. 2. Additional information on the various standards used may be obtained from the International Sales Department, American National Standards Institute, 1430 Broadway, New York, N.Y. 10018.

The router module 20 (FIG. 1) also includes a conventional cassette driver and manager 62 which provides the interface between the router module 20 and the cassette terminal 52. The cassette driver and manager 62 includes the parallel interface 108 shown in FIG. 5, and this interface may be an Intel 8255, Integrated Circuit Parallel Interface Adapter made by Intel Corporation.

An important feature of this invention is that the router module 20 (FIG. 1) enables the terminals like 24 and 26, for example, to communicate with each other without the intervention of a complex computer system as earlier explained herein.

Figure 3:
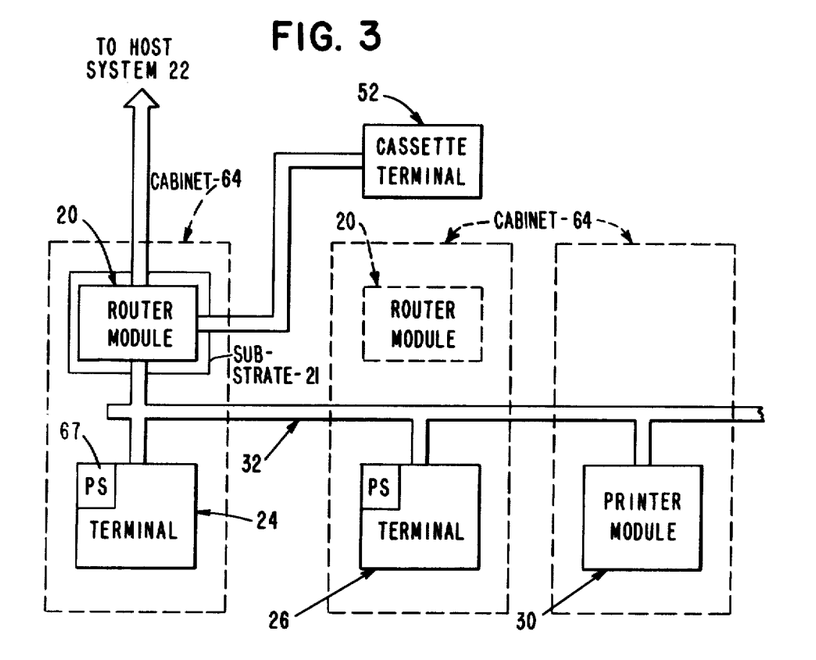
FIG. 3 is a block diagram showing how the router module of this invention may be incorporated within the housing of one of the terminals shown in FIG. 1.

Another feature is that the router module 20 (FIG. 1) may be mounted on a substrate 21 and incorporated within one of the terminals like 24 as shown in FIG. 3. The terminal 24 is housed within a conventional cabinet 64 (shown only in dashed outline in FIG. 3), and the router module 20 is housed within the cabinet 64. Each of the terminals like 24 and 26 has its own power supply (PS) 67 associated therewith, and consequently, the router module 20 is designed to utilize the power supply 67 of the terminal like 24 in which it is housed.

Earlier herein it was stated that DLC protocol used is a bit oriented system. In the embodiment described, the information which is sent up from the terminals like 24 and 26 has the format of the data string 66 shown in FIG. 2. The data string 66 is comprised of 8 bit bytes with the entire string 66 being comprised of up to a maximum of 256 such bytes, for example, although this number could be changed to suit different applications.

The first three bytes of the data string 66 (FIG. 2) are referred to as the DLC header and are embraced by bracket numbered 68. The header 68 is comprised of an 8 bit flag (F) byte, an 8 bit address (A) byte, and an 8 bit command status (C/S) byte. The distributive network architecture (DNA) header which is embraced by a bracket numbered 70 is comprised of an 8 bit packet format (P/F) byte, an 8 bit packet type (P/T) byte, two 8 bit bytes of a logical origin address (LOA), and two 8 bit bytes of a logical destination address (LDA).

The data string 66 (FIG. 2) also includes a DLC trailer which is embraced by the bracket 72 and which is comprised of two 8 bit bytes of a cyclic redundancy check (CRC) and an 8 bit flag byte (F). The CRC provides a cyclical redundancy check for checking any errors of transmission which generally are due to noise occurring during transmission. The check is effected by a conventional complex algorithm by a hardware integrated circuit associated with the serial interface unit 106 shown in FIG. 5. The binary data 74 which is to be transmitted in the data string 66 lies between the DNA header 70 and the DLC trailer 72 as shown.

The DLC header 68 and the DLC trailer 72 of the data string 66 (FIG. 2) are used to get data from the terminals such as 24 and 26 (FIG. 1) and the printer module 30 to the DLC communications primary driver 54, to the router module 20, and back to the various terminals like 24 and 26 and the printer module 30 in the example being described. For communication with regard to the host system 22, the DLC header 68 and DLC trailer are used to get information from the secondary driver 58 to the host system 22 and vice versa.

As stated earlier herein, the amount of binary data 74 (FIG. 2) within a data string 66 may vary. In the embodiment described, a data string 66 may be up to 256 bytes long with up to 244 bytes being provided for binary data 74. The primary driver 54 (FIG. 1) has a buffer (not shown) to receive up to 256 bytes of information in the embodiment being described. Because the data string 66 may be varied in length, the driver needs some means for determining how long the binary data 74 is in a particular data string 66. This is accomplished by including a conventional circuit in the primary driver 54 which is triggered to start counting by the flag byte (F) in the DLC header 68. A count of 7E (in hex code) for example, can be used in the flag byte (F) to initiate the counting. Because the DLC header 68, the DNA header 70, and the DLC trailer 72 are of a fixed length in a data string 66, when the flag byte F in the DLC trailer 72 is received, it is used to trigger a subtraction in the serial interface unit 106 associated with the primary driver 54 which subtracts a fixed number of bytes from the count which was initiated by the flag byte in the DLC header 68 to arrive at the information included in bracket 76 in FIG. 2. The DNA header 70 in bracket 76 is used to provide the routing information to the routing logic 60 in FIG. 1 as will be described hereinafter. The flag byte (F) included in the DLC trailer 72 also has a designation of 7E in hex code.

The routing logic 60 (FIG. 1) always uses the DNA header 70 data to ascertain where to send the associated binary data 74. The routing logic 60 functions as though it were handling a "hot potato", in that upon receiving the information included in bracket 76, the routing logic 60 immediately transfers the information to one of the three drivers 54, 58, or 62 (FIG. 1).

The method by which the information is transferred or routed via the routing logic 60 is handled by the Decision Table 61 shown hereinafter in Table 1A and Table 1B. Tables 1A and 1B should be read together with Table 1B being placed to the right of Table 1A so that Lines 1b through 18b of Table 1B are aligned with Lines 1a through 18a, respectively, of Table 1A.

TABLE 1A

|  | | ORIGIN OF RECEIVED MESSAGE (LOA) | LOGICAL DESTINATION ADDRESS (LDA) OF RECEIVED MESSAGE | |
|---|---|---|---|---|
|  | | | | $S_3$–$S_0$ |
| Line | 1a | TERMINAL | $S_{15}$ through $S_4$ | 0000 |
|  | 2a | ANY | " | 0001 |
|  | 3a | " | " | 0010 |
|  | 4a | " | " | 0011 |
|  | 5a | " | " | 0100 |
|  | 6a | " | " | 0101 |
|  | 7a | " | " | 0110 |
|  | 8a | " | " | 0111 |
|  | 9a | " | " | 1000 |
|  | 10a | " | " | 1001 |
|  | 11a | " | " | 1010 |
|  | 12a | " | " | 1011 |
|  | 13a | " | " | 1100 |
|  | 14a | " | " | 1101 |
|  | 15a | " | " | 1110 |
|  | 16a | " | " | 1111 |
|  | 17a | TERMINAL | 0000 0000 0000 | 0000 |
|  | 18a | " | ANY OTHER LDA | |

TABLE 1B

DESTINATION TO WHERE ROUTER MODULE 20 SENDS MESSAGE

| Line | 1b | RM (ACTIVATION MESSAGE FOR RM) | |
|---|---|---|---|
|  | 2b | TERMINAL INDIVIDUAL LINK | 0001 |

TABLE 1B-continued

| | DESTINATION TO WHERE ROUTER MODULE 20 SENDS MESSAGE | |
|---|---|---|
| | ADDRESS | |
| 3b | TERMINAL INDIVIDUAL LINK ADDRESS | 0010 |
| 4b | TERMINAL INDIVIDUAL LINK ADDRESS | 0011 |
| 5b | TERMINAL INDIVIDUAL LINK ADDRESS | 0100 |
| 6b | TERMINAL INDIVIDUAL LINK ADDRESS | 0101 |
| 7b | TERMINAL INDIVIDUAL LINK ADDRESS | 0110 |
| 8b | TERMINAL INDIVIDUAL LINK ADDRESS | 0111 |
| 9b | TERMINAL INDIVIDUAL LINK ADDRESS | 1000 |
| 10b | TERMINAL INDIVIDUAL LINK ADDRESS | 1001 |
| 11b | TERMINAL INDIVIDUAL LINK ADDRESS | 1010 |
| 12b | TERMINAL INDIVIDUAL LINK ADDRESS | 1011 |
| 13b | TERMINAL INDIVIDUAL LINK ADDRESS | 1100 |
| 14b | RESERVED | |
| 15b | RESERVED | |
| 16b | DIGITAL CASSETTE DRIVER - MANAGER | |
| 17b | PRIMARY DLC DRIVER (PING PONG TEST REQUEST) (FOR TERMINAL LINK) | |
| 18b | LINK (TO HOST) | |

Before discussing the contents of the Decision Table 61 shown in Tables 1A and 1B, it appears appropriate to discuss the coding involved therein. While FIG. 1 shows only one router module 20 associated with the host system 22, more than one router module may be utilized as shown in FIG. 4.

Figure 4:
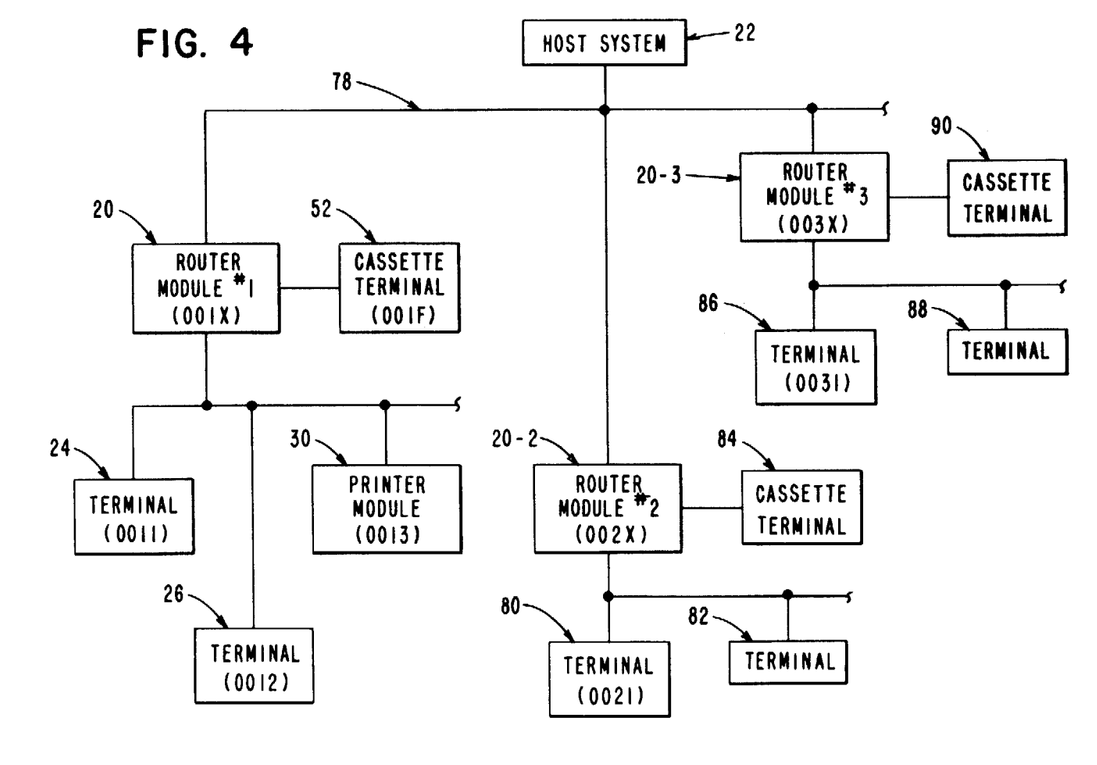
FIG. 4 is a schematic block diagram showing how several router modules may be coupled to a host system.

FIG. 4 is a schematic diagram in block form showing how several router modules like 20, already discussed, may be coupled to the host system 22. The router module 20, also marked as #1 in FIG. 4, is coupled to the host system 22 by a conventional common bus 78. A second router module marked as #2 and reference numeral 20-2 and a third router module marked as #3 and reference numeral 20-3 are also coupled to the host system 22 via the bus 78 as shown. Router module 20-2 has terminals 80 and 82 and the cassette terminal 84 associated therewith, and these terminals may be identical to terminals 24, 26, and 52 associated with router module 20. Similarly, router module 20-3 has terminals 86 and 88 and cassette terminal 90 associated therewith. The router modules 20-2 and 20-3 may also have printer modules (not shown but similar to printer module 30) associated therewith to enable several terminals like 80 and 82 to utilize a printer module in shared relationship as previously described.

In the embodiment described, the identification coding for the modules and terminals shown in FIG. 4 is given in hex coding and is shown within parentheses within the associated block or module. For example, router module 20 is identified by the (001X) coding shown therein. The "X" in the coding represents "don't care" bits. The terminals 24 and 26 are identified by the (0011) and (0012) coding shown, and the printer module 30 is identified by the (0013) coding shown. The cassette terminal 52 is identified by (001F) in hex form.

To summarize, the identification of the various router modules like 20, is effected by the first three characters (in hex form) within the parenthesis when reading from left to right, and the terminals or the printer modules (like module 30) which are associated with a particular router module like 20 are identified by the right-most character within the parenthesis (like numeral 3 given in hex form for module 30).

While referring to the Tables 1A and 1B and FIG. 4, the following discussion will further explain the functioning of the router module 20. A feature of this invention is that the terminals such as terminals 24 and 26 coupled to the router module 20 perform the decision-making logic with regard to what is to be done to a message which originates at that particular terminal. For example, if terminal 24 (FIG. 1) were to send a message to the printer module 30, the message would have the appearance of the data string 66 shown in FIG. 2 in which two 8 bit bytes for a total of 16 bits are provided for the LDA and a similar amount is provided for the LOA. In this instance, the destination address (LDA) is (0013, in hex form), representing printer module 30. Looking at line 4a in Table 1A, the twelve bits $S_{15}$–$S_4$ (high order) represent the identification of the router module itself as already explained in relation to module 20 in FIG. 4, and the last four binary bits (low order) on line 4a (a binary 3) represent the identification of the printer module 30. The twelve bits $S_{15}$–$S_4$ are the high order bits and they are strapped or fixed to the router module 20; in other words, data from any terminal like 24 or 26 will be forwarded directly to another terminal like 28 associated with that router module 20 by the module 20. Line 13a in Table 1A indicates that data from any terminal like 24 in FIG. 1 will be routed to the terminal (001C) in hex form or terminal (1100) as written in binary form in Table 1A, with this last-named terminal not being shown in the drawings.

From line 16a in Table 1A, a LDA of 1111 (in binary form) indicates that a message from any one of the terminals like 24, for example, which terminals are associated with the router module 20, will be routed to the cassette terminal 52 as shown in FIG. 4.

Before discussing how data or information is transferred to and from the various elements shown in FIG. 1, it seems suitable to discuss generally, the hardware which is associated with the various logical functions or representations shown in FIG. 4.

Figure 5:
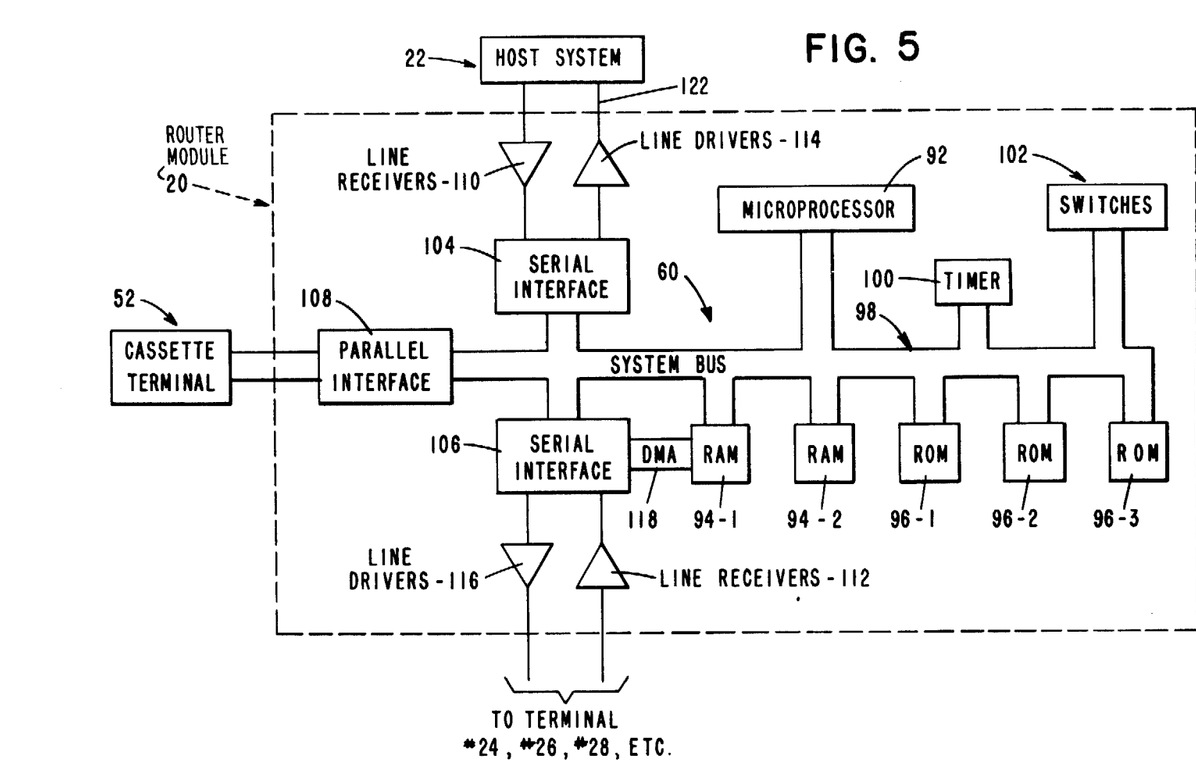
FIG. 5 is a diagrammatic block diagram showing one embodiment of the hardware used to implement the routing logic shown in FIG. 1.

FIG. 5 is a diagrammatic block diagram showing one embodiment of the hardware used to implement the routing logic 60 of the router module 20 whose logical representation is shown in FIG. 1. The router module 20 includes a processor such as microprocessor (MP) 92, a plurality of random access memories (RAMs) such as RAMs 94-1 and 94-2, and a plurality of read only memory (ROM) units such as 96-1, 96-2, and 96-3, for example, which are conventionally intercoupled by a system bus 98. Naturally, the number of RAM units and ROM units used is dependent upon the needs of a particular system. The RAM units 94-1 and 94-2 are shown only as RAM 94 in FIG. 1, and similarly, ROM units 96-1, 96-2, and 96-3 are shown only as ROM 96 in FIG. 1.

The routing logic 60 (FIG. 5) also includes a timer 100 which is selected to provide a plurality of different predetermined times as needed by the particular routing logic 60 rather than use the MP 92 for this function. The routing logic 60 also includes a plurality of switches such as manually-settable switches 102, with one such switch being provided for each router module like 20. In the embodiment described, the switches 102 are used to set the upper twelve bits or $S_4$ through $S_{15}$ shown in Table 1A so as to identify each terminal or module within the system as earlier explained. The terminals, like 24, must provide the full 16 bits for identification of the LOA, for example; however, the highest 12 bits thereof are the same as those of the associated router module. The full 16 bits for identification of the LOA or portions thereof may be provided from software or keyboards associated with the terminals.

The router module 20 (FIG. 5) also includes the conventional serial interface unit 104 which is used to interconnect the module 20 with the host system 22, and similarly, the module 20 also includes the conventional serial interface unit 106 which is used to interconnect the module 20 with the terminals such as 24, 26, 28, etc. as described in relation to FIG. 1. A conventional parallel interface including unit 108 is used to interconnect the module 20 with the cassette terminal 52 simply to match the type of terminal 52 employed although a serial interface (not shown) could be used with a matching serial type terminal 52. Conventional line receivers 110 are used to receive signals from the host system 22, and similarly line receivers 112 are used to receive signals from the terminals 24, 26, and 28. The receivers such as 110 and 112 include transformers to receive signals and to provide line isolation, and also include operational amplifiers to provide proper band pass capability for receiving only the desired signals, for eliminating noise, and for shaping the signals into well-shaped digital signals which are fed into the associated serial interface units 104 and 106 which are digital-type devices. The line drivers 114 and 116 are used to strengthen the signals coming from the associated serial interface units 104 and 106, respectively, to modify the signals into signals which are somewhat more analog in nature so as to provide some line-driving capability, and to provide line isolation (via a transformer) as is conventionally done. The line receivers 110 and 112 may be Motorola MC 1489 Integrated Circuit Chips which are manufactured by Motorola Corporation. The line drivers 114 and 116 may be Motorola 14C1488 Integrated Circuit Chips which are also manufactured by Motorola Corporation. The parallel interface unit 108 contains 8 data send lines, 8 data receive lines and several associated control lines (not shown) to strobe data between the router module 20 and the cassette terminal 52. The parallel interface unit 108 may be conventional such as integrated circuit #8255 which, for example, is manufactured by Intel Corporation.

The router module 20 (FIG. 5) also includes a conventional direct memory access (DMA) unit 118 which is utilized to avoid having the MP 92 directly effect the accessing of memory. This aspect will be discussed hereinafter.

The software associated with the primary driver 54 lies in ROM 56 (FIG. 1), the software associated with the secondary driver 58 lies in a ROM 120, and similarly, the software associated with the cassette driver and manager 62 lies in a ROM 122. The software associated with the drivers 54, 58, and the manager 62 is conventional and is dependent upon the particular system or protocol used; consequently, it will not be discussed in detail herein. The ROMs 56, 120, and 122 are shown as separate items for ease of illustration; however, they may comprise a portion of the ROMs 96-1, 96-2, and 96-3 shown in FIG. 5.

The software associated with the router module 20 lies in portions of the ROMs 96-1, 96-2, and 96-3 shown in FIG. 5. Basically, there are three major subroutines forming the software for the routing logic 60; they are:

(a) Subroutine 1, which processes all responses from the terminals such as 24, 26, etc.;

(b) Subroutine 2 which services output messages going to and coming from the host system 22; and (c) Subroutine 3 which performs the routing logic associated with the Decision Table shown in Tables 1A and 1B discussed earlier herein. Subroutine 3 is called by subroutines 1 and 2.

Subroutine 1 is part of the primary driver 54 shown in FIG. 1, and it carries out the main functions thereof. Subroutine 1 performs the usual handshaking and protocol associated with the data like communications (DLC) mentioned earlier herein. For example, if one of the terminals like 24 in FIG. 1 wishes to send a data message to either the host system 22 or one of the other terminals, such as 26, the primary driver 54 checks the data string 66 (FIG. 2) to make sure that a proper format exists. After the usual handshaking procedures, a point is reached in the processing by the primary driver at which it determines, after protocol error checking, that the data string 66 is in the proper format and is correct. At this point, the primary driver 54 calls the router module 20 to pass that portion of the data string 66 shown in bracket 76 in FIG. 2 thereto. The DLC header 68 and the DLC trailer 72 are used for protocol purposes.

Subroutine 2 is part of the secondary driver 58 shown in FIG. 1, and it carries out the main functions thereof. Essentially, subroutine 2 is communications driver and it calls upon subroutines of a smaller nature in order to effect that function. Because this subroutine may be conventional and is dependent upon the particular protocol used as mentioned earlier herein, it need not be described in any further detail. Eventually a point will be reached at which the driver 58 will decide that the data coming from the host system 22 is in the proper format and is correct. At this point, the secondary driver 58 calls the router module 20 to pass the data thereto.

Subroutine 3, alluded to earlier herein, is used to perform the routing logic; essentially, it interprets the Decision Table 61 shown in Tables 1A and 1B. The routing logic 60 for the router module 20 is shown in Table 2 which is listed hereinafter.

TABLE 2

Router Module 20 essentially contains the routing logic for messages, based on a logical destination address.

A. Pseudo-Structured Code (1) If message destination is to a terminal, THEN return LOWRTF=1,HIWRTF=0.
(2) If message destination is to host system 22, THEN
    (2a) Increment Nr count of origin via call to UPDTNR.
    (2b) If (host) buffers are full or host line is inactive THEN dispose of message.
    ELSE set host buffer full flag to indicate which buffer message is in and return LOWRTF=0,HIWRTF=1.
(3) If message is Ping Pong test request, THEN
    (3a) Increment link Nr via call to UPDTNR.
    (3b) Run Ping Pong test via call to PPTDX.
(4) If message is to be broadcast, THEN
    (4a) Increment link Nr via call to UPDTNR.

(4b) Swap logical origin address and logical destination addresses.
(4c) Set up group 1 address field and unnumbered information control field (Poll bit=0).
(4d) Transmit frame via call to DMAOUT.
(5) If message is router diagnostic, THEN
   (5a) Increment link Nr via call to UPDTNR.
   (5b) Push return address.
   (5c) Push 2 byte test number.
   (5d) Generate table entry address and begin execution at given address.
(6) If message destination in cassette terminal 52, THEN
   (6a) Increment link Nr via call to UPDTNR.
   (6b) Process message via call to DCMESG.

B. Entry Point and Calling Sequence

CALL Router Module 20

C. Exit Conditions

No requirements

D. Externally Defined Subroutines

UPDTNR—increment station Nr count.
RETURN—dispose of undeliverable message.
MOVBUF—move block of memory
DMAOUT—transmit frame via DMA
CHSTAT—send RNR message.
PPTDX—execute in-link Ping Pong Test.
DCMESG—process digital cassette terminal 52 message.

E. Other Considerations

In the embodiment described, an 8085 type microprocessor 92 was used in association with the various programs and subroutines mentioned, and in the process, certain registers associated with the microprocessor 92 were destroyed. The particular registers which were destroyed were the PSW, B, C, D, and E registers; they are listed here simply to facilitate the writing of other routines which may be associated with the router module 20.

The routing logic 60 is shown in pseudostructured code beginning at A in Table 2. A description of each of the various code words used therein is listed at the end of Table 2. The routing logic 60 is presented in a series of, "If", statements followed by, "Then", statements which define what the routing logic 60 will do under given situations or conditions. A general discussion of Table 2 will follow.

Figure 2:
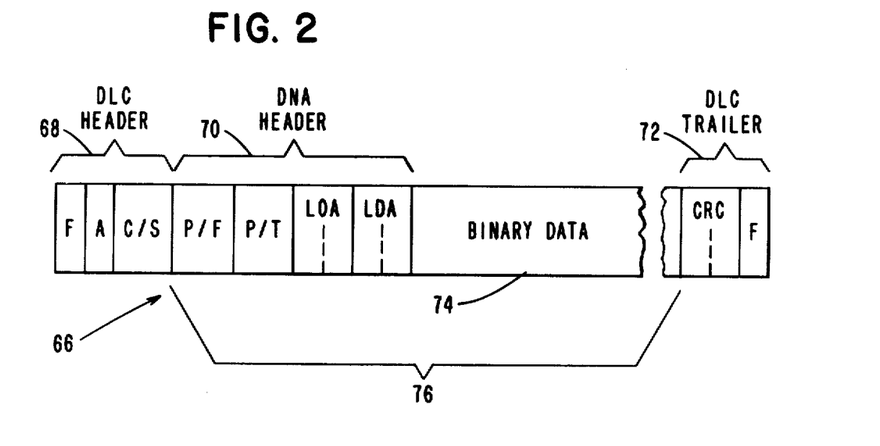
FIG. 2 is a diagrammatic view showing a type of protocol which may be used with this invention.

With regard to Table 2, line 1 thereof states that if a message is to be transferred to a terminal like 26, for example, two flags are set. The embodiment described sets a write flag (LOWRTF) equal to a binary one and a write flag (HIWRTF) equal to a binary zero. The binary one flag indicates to the primary driver 54 that it may use the data which is in a buffer located in the RAM 94-1 (FIG. 5) and the binary zero flag indicates to the secondary driver 58 that it may not use this data. These flags LOWRTF and HIWRTF are not those flags which are associated with the DLC header 68 and DLC trailer 72 as shown in FIG. 2, but they are flags which are used by the routing logic 60 to indicate whether the router module 20, the primary driver 54, or the secondary driver 58 has control of the message or data. The router module 20, the primary driver 54, and the secondary driver 58 can all work asynchronously, and can communicate with one another by the use of the flags LOWRTF and HIWRTF.

With regard to Table 2, line 2 thereof states that if a message is to be routed to the host system 22, then certain counters such as Nr counters are incremented to take care of certain housekeeping functions; this is effected by a call to a subroutine which is identified as UPDTNR. The Nr counters (not shown) are utilized to indicate to the primary driver 54 that a message has been received correctly and has been processed (relayed at a later time to the host system 22). For example, the Nr counters are "scratch-pad" counters which are associated with the MP 92 (FIG. 1), and the term "Nr" stands for "number received" count. In the embodiment described, three bits are reserved for this count and they appear in the command status (C/S) word of the DLC header 68 shown in FIG. 2.

Before the message can be relayed to the host system 22, it is necessary first to determine whether or not certain buffers in RAM 94-1, for example, are available to store the message until the host system 22 requests it. If there are no available buffers, or if the line 122 (FIG. 5) is active as indicated on line 2b), then the message is disposed of and the terminal which initiated the message must try again at a later time to send the message. If a buffer (to host) in RAM 94-1, for example, is available, then the message is transferred thereto, and a flag is set in RAM 94-1 to indicate that this buffer is full. The HIWRTF flag is then set to a binary one indicating that the communication with the driver 58 (FIG. 1) is desired.

With regard to Table 2, line 3 thereof indicates a check on an incoming message to determine whether or not it represents a request for a Ping Pong test. As used herein, this test is simply a diagnostic test to check on the hardware shown in FIG. 5 to determine whether or not it is operating properly and to enable a serviceman to repair the router module 20 if it is not. Line 3a of Table 2 is identical to line 2a thereof already described. Line 3b indicates a call to a subroutine PPTDX which contains all the necessary steps to effect the diagnostic test. Because this aspect is not important to this invention, it need not be described in any further detail.

With regard to Table 2, line 4 thereof indicates a check to determine whether or not a message is to be broadcast. As used herein, the term broadcast means the ability of the router module 20 to transmit a message simultaneously to all the associated terminals like 24, 26, 28, and 30 shown in FIG. 1.

Messages are broadcasted in the following situations:
1. If a broadcast program load is requested, the appropriate or selected data records from the cassette terminal 52 (FIG. 1) will be broadcasted to the terminals like 24 associated with a router module like 20.
2. If a message is received from the host system 22 and its logical destination address (LDA) is not equal to one of the terminals like 24, 26, 28, or 30 associated with a router module like 20, it will be broadcasted to all of the terminals associated with that router module.
3. If a message is received by a router module like 20 from an associated terminal like 24, 26, for example, and the message has a logical origin address (LOA) which is not equal to the address of any one of these terminals, it will be broadcasted to all the associated terminals.

With regard to the host system 22 broadcasting messages to terminals associated with a particular router module like 20, for example, the following comments apply. Each router module like 20, 20-2, and 20-3 shown in FIG. 4 has its own slightly different protocol associated therewith; this feature enables the host system 22 to select the particular router module like 20, 20-2, or 20-3 with which it is to communicate. In other words, when the host system 22 wishes to communicate with a particular terminal like 24 associated with a router module like 20, it first selects router module 20 (via the protocol mentioned), and thereafter the data string like 66 in FIG. 2, which has the appropriate LDA therein, is used by the router module 20 to route the message to the appropriate terminal. If the LDA in the data string 66 is not equal to one of the terminals associated with a router module like 20, then the message is broadcasted to all the terminals associated with that router module.

The following Table 3 indicates how a message from a terminal like 24 in FIG. 4 is routed in a broadcast mode to the other terminals like 26 and 30 associated with the router module 20.

TABLE 3

|        | LOA  | LDA  |
|--------|------|------|
| Line 1 | 0011 | 0013 |
| Line 2 | 1111 | 0011 |
| Line 3 | 0011 | 1111 |

The numbers shown in Table 3 are hexadecimal designations. Line 1 in Table 3 represents a selective transference; it indicates that a data message originating at terminal 24, also having an LOA marked (0011) in FIG. 4 will be routed to the printer 30, having the LDA of (0013). Line 1 in Table 3 is similar to the function of Tables 1A and 1B which handle all messages except the broadcast messages.

Line 2 in Table 3 shows how a terminal like 24 in FIG. 4 can initiate a broadcast message to the other terminals like 26 and 30 associated with the router module 20. When a broadcast message is to be initiated at the terminal 24, its LOA is purposely changed (via a keyboard entry, for example) from the usual (0011) to an LOA of (1111) as seen in line 2 of Table 3. Because this is not the usual LOA designation associated with the terminal 24, the router module 20 recognizes this as a request to broadcast the message, and the router module 20 will then switch the LOA and LDA fields as shown in Line 3 of Table 3. Line 3 of Table 3 effects the broadcasting mode to the other terminals like 26 and 30 associated with router module 20.

The address marked A located in the DLC header 68 of the data string 66 is utilized by a router module like 20 to broadcast a message to its associated terminals, like 24, 26, etc. The address A in the DLC header 68 is an 8 bit address, in the embodiment described, and is referred to as the link address in Table 1B. The first four bits on a line like 13b in Table 1B represent the upper four bits of the link address. In the particular embodiment described, the lower four bits of the 8 bit address A are all identical; consequently, they are not shown in Table 1B. For router module 20 shown as module #1 in FIG. 4, the hex designation therefor is (001X) as previously described. A terminal like 26 in FIG. 4 having a hex designation of (0012) is represented by line 3b in Table 1B.

Continuing with broadcasting a message, line 4a of Table 2 is identical to line 2a already described. Line 4b describes the function of switching the LDA and LOA fields in the DLC header 68 of the data string 66 so that the message will be in the proper format to be transmitted down the line drivers 116 associated with the primary driver 54. Line 4(c) describes the DLC protocol requirements associated with the primary driver 54 to broadcast a message. Line 4(d) refers to calling a subroutine which is part of the primary driver 54; this subroutine transmits the message down the communications link including the line drivers 116 shown in FIG. 5.

With regard to Table 2, line 5 thereof refers to certain messages which are initiated by the terminals like 24, and are used to activate the router modules like 20 to perform certain test or diagnostic routines. These certain messages are recognized by the router modules, like 20, by the logical destination address (LDA) shown in Table 1A. For example, a user of a terminal like 24 may want to initiate a test routine on its associated router module 20. The LDA of the associated router module 20 is supplied by the terminal 24, for example, and is located in the DNA header 70 shown in FIG. 2. The upper twelve digits $S_{15}-S_4$ entered are the same as the digits which are strapped to the router module 20; these digits are manually entered upon the switches (shown generically as 102 in FIG. 5) associated with the router module 20. The lower four digits $S_3-S_0$ are all zeroes as shown on line 1a of Table 1A. The 16 digits mentioned, $S_{15}-S_0$ indicate to the router module 20 that a test or diagnostic routine is requested, and the test routine requested is entered as part of the data string 66 (FIG. 2) entered upon the terminal 24 in the example being described.

If a diagnostic or test routine is requested as discussed in the prior paragraph with regard to paragraph 5 of Table 2, then steps 5a through 5d will follow as listed in Table 2. Step 5a is identical to step 2a already described. At steps 5b, 5c, and 5d, a subroutine associated with the router module 20 and stored in a ROM like 96-1, for example, is called upon for the execution of the test routine requested. The subroutine mentioned will save the return address (step 5b) and then calculate (step 5c) the address (in a lookup table) as to where the requested test routine is located (step 5c). Thereafter the router module 20 executes (step 5d) the test routine first accessed. When the test routine is completed, control is returned to the router module for continued processing.

With regard to Table 2, line 6 indicates a check to determine whether or not a message destination is for the cassette terminal 52. As seen from Line 16a of Table 1A, when the $S_3-S_0$ digits of the LDA are all binary 1s, the message destination (from line 16b of Table 1B) is the cassette terminal 52. Step 6a is identical to step 2a, already described, and step 6b relates to processing the message by calling a subroutine DCMESG which provides the necessary steps to effect the transfer of the message to the cassette unit or terminal 52.

Paragraph B of Table 2 simply relates to an entry point for calling the router module 20.

Paragraph C of Table 2 indicates that no special requirements are necessary to exit from the routines discussed in relation to the router module 20.

Paragraph D of Table 2 lists the externally defined subroutines which are used with the router module 20.

Paragraph E of Table 2 states other considerations associated with the router module 20; these considerations have been discussed earlier herein in connection with Table 2.

Having described generally some of the routines (Table 2) associated with the routing logic 60, it appears appropriate to discuss, in more detail, how a message such as a data string 66 shown in FIG. 2 is processed by the router module 20 shown in FIGS. 1 and 5.

A message like data string 66 which originates at a terminal like 24 (FIG. 1) will pass through the line receivers 112 (FIG. 5) to the serial interface unit 106. The interface unit 106 recognizes a message like data string 66 by its starting flag F in header 68, and its ending flag F in trailer 72. As the message is received by the interface unit 106, it is transferred into the RAM 94-1 by the DMA unit 118. After the entire data string 66 is received at the interface unit 106, a CRC error check is made of the data within the data string 66 to make sure that errors are detected. After the error check is made, the interface unit 106 will interrupt the MP 92, informing it that the unit 106 has a message which it can dispose of. Thereafter, the MP 92 will enable the primary driver 54 (FIG. 1) to execute an associated program which is a part thereof, and which program establishes communication or transfer protocol. The message or data string 66 is left in the RAM 94-1 at a particular address therein. The program associated with the primary driver 54 will then call the routing logic 60 which will determine the destination of the message. The program associated with the routing logic 60 is stored in a portion of ROM 96-1, for example, and the MP 92 in conjunction with this program and the Decision Table 61 shown in Tables 1A and 1B will ascertain where the message is to be sent. In the example being described, the LDA of the header 70 (FIG. 2) of the data string 66 may indicate that the message is to go to the printer module 30 (FIG. 1). This means that the primary driver 54 is called, and it is given the starting address of the data string 66 which was stored in the ROM 94-1. The driver 54 then gives the appropriate command to the DMA unit 118 to effect the transfer of the data string 66 from the ROM 94-1 to the interface unit 106, which in turn will transfer the data string 66 to the line drivers 116 which in turn transfer the data string 66 to the printer module 30 in the example being described. While the message transferred is described as being the entire data string 66, there are many messages which are transferred, for example, between the terminals like 24, 32 and the MP 92 which messages have only the DLC header 68 and the DLC trailer 72 (FIG. 2) forming the entire message data string like 66. These shortened messages are simply protocol control messages which may be going on all the time asynchronous to the fact that the MP 92 in association with the routing logic 60 is also concurrently executing the program represented by the routing logic 60.

When a message such as that represented by data string 66 is to be transferred from a terminal, like 24, to the host system 22 (FIG. 1), the following procedure is used. As previously described, the destination or LDA of the data string 66 is entered on a terminal like 24 or initiated thereby, and that data string is routed up the line receivers 112 (FIG. 5) to the interface unit 106. From the interface unit 106, the data string 66 is transferred to the RAM 94-1, for example, by the DMA unit 118 as previously described. After error detection and correction have been performed with regard to the CRC bytes in the trailer 72 (FIG. 2), the MP 92 will be interrupted and the MP 92 will start execution of the software portion of the primary driver 54 which examines the LDA and C/S fields of the data string 66. After examination, the data string 66 is passed to the routing logic 60 with a software cell. This call is referred to in section B of Table 2. The software associated with the routing logic 60 will ascertain from the LDA of the data string 66 that the message is to be transferred to the host system 22. In this regard, the routing logic 60 will call the secondary driver 58 so that the message can be transferred to the host system 22. The address at which the message or data string 66 is stored in RAM 94-1 is then passed to the secondary driver 58 which includes a program which is stored in a ROM 120. The secondary driver 58 then waits for a poll or call from the host system 22 to effect the transfer of data thereto. In the embodiment described, the interface unit 104 transfers one character at a time to the host system 22, and while this is being done, the MP 92 then pulls the next character from the data string 66 stored in the RAM 94-1 through the accumulator of the MP 92 and transfers it to the interface unit 104. From the interface unit 104, the characters are sent via the line drivers 114 to the host system 22. In the embodiment described, the characters are transmitted serially out of the interface unit 104 at a maximum rate of 4800 Baud. Thus, while the interface unit 104 is transmitting one character at a time, the MP 92 can suspend the secondary driver 58, permitting the MP 92 to process other procedures such as the polling of terminals such as 24 and 26 and transmitting other messages throughout the system. Essentially, transferring characters out of the serial interface unit 104 takes longer than it takes the MP 92 to feed characters thereto from the RAM 94-1. The interface unit 104 is conventional and may be a #8251 integrated circuit chip (previously mentioned) which is manufactured by Intel Corporation, for example.

Data about the Intel 8251 may be found in a book entitled, "Intel 8080 Microcomputer Systems User's Manual", published in September 1975 by Intel Corporation. Pages 5-135 through 5-146 of this book cover the Intel 8251. The first paragraph of the explanation for the 8251 from the first page 5-135 of the above citation is included herein because it is instructive:

"The 8251 is a Universal Synchronous/Asynchronous Receiver/Transmitter (USART) Chip designed for data communications in microcomputer systems. The USART is used as a peripheral device and is programmed by the CPU to operate using virtually any serial data transmission technique presently in use (including IBM Bi-Sync). The USART accepts data characters from the CPU in parallel format and then converts them into a continuous serial data stream for transmission. Simultaneously it can receive serial data streams and convert them into parallel data characters for the CPU. The USART will signal the CPU whenever it can accept a new character for transmission or whenever it has received a character for the CPU. The CPU can read the complete status of the USART at any time. These include data transmission errors and control signals such as SYNDET, TxEMPT. The chip is constructed using N-channel silicon gate technology."

As far as transmission of characters is concerned, the MP 92 selects two eight bit bytes or two characters from the data string 66 and transfers them to the interface unit 104. While the first of these two bytes is being transmitted, the second byte is located at a ready station or a buffer (not shown) included in the interface unit 104. When the first byte or character is sent over the line drivers 114, an interrupt signal is sent to the MP 92 to interrupt it to obtain the third character or byte as the interface unit 104 transfers the second byte or character from its buffer to start the transmission of the second byte over the drivers 114.

When a message such as data string 66 (FIG. 2) is to be transferred from the host system 22 to one of the terminals like 24 or 26 (FIG. 1), for example, the following procedure is used. In this situation, the secondary driver 58 will issue a call to the router module 20; this will cause the MP 92 to execute the routing logic 60. The LDA of the data string 66 will indicate (via Tables 1A and 1B) that the message is to go to terminal 24, in the example being described, and the data string 66 will be stored in the RAM 94-1 (FIG. 5). The routing logic 60 will then call the primary driver 54 (FIG. 1) to effect the transfer. The primary driver 54 will initiate the appropriate input and output (I/O) commands required for the serial interface unit 106 (FIG. 5) to set up the DMA unit 118 previously described. The message will then be sent serially over the line drivers 116 to the terminal 24. The terminal 24 responds by sending a supervisory frame to the router module 20 as part of the protocol associated with the primary driver 58.

I claim:

1. A system comprising:
   a host system;
   a plurality of terminal units including first terminal units of a first type and other terminal units of at least a second type, said type terminal units having means for also entering routing data into the system and for entering a string of information into the system said routing data including a logical origin address (LOA) which indicates the origin of a said string of information to be routed and a logical destination address (LDA) which indicates the intended destination of said string of information; and
   a router module comprising:
   first coupling means for coupling said router module with said host system for transferring a said string of information to or from said host system;
   second coupling means for coupling said router module with said first type terminal units and said other type terminal units for transferring a said string of information to selected ones of said first type terminal units or said other type terminal units or for transferring a said string of information from one of said first type terminal units to at least another one of said first type terminal units or said other type terminal units; and
   routing logic including a decision table which utilizes said routing data to route said string of information in accordance with said routing data.

2. The system as claimed in claim 1 in which said router module further includes means for assigning a said LOA to each of said first type terminal units and said other type terminal units for identification thereof, and in which said routing logic includes a portion for examining the LOA of each said string of information and also for routing said string of information in a broadcast mode to each of said first and other type terminal units when the LOA in a string of information is different from the LOA assigned to that said first or other type terminal unit from which the said string of information originated.

3. A system comprising:
   a host system;
   means for storing data;
   a plurality of terminal units including first terminal units of a type and other terminal units of at least a second type, said first type terminal units having means for also entering routing data into the system and for also entering a string of information into the system; said routing data including a logical origin address (LOA) which indicates the origin of a said string of information to be routed and a logical destination address (LDA) which indicates the intended destination of said string of information; and
   a router module comprising:
   first coupling means for coupling said router module with said host system for transferring a said string of information to or from said host system;
   second coupling means for coupling said router module with said first type terminal units and said other type terminal units for transferring a said string of information to selected ones of said first type terminal units or said other types terminal units or for transferring said string of information from one of said first type terminal units to at least another one of said first type terminal units or said other type terminal units;
   third coupling means for coupling said router module with said storing means for transferring a said string of information to and from said storing means; and
   routing logic including a decision table which utilizes said routing data to route said string of information in accordance with said routing data.

4. The system as claimed in claim 3 in which each said first type terminal unit has a source of power supplied thereto and also has means for mounting said router module therein, to enable said router module to be mounted in one of said first type terminal units of said plurality of terminal units to enable the router module to utilize the associated said source of power.

5. The system as claimed in claim 4 in which said other type terminal units include a printer module which is shared by at least two of said first terminal units to receive a said string of information therefrom.

* * * * *

UNITED STATES PATENT AND TRADEMARK OFFICE
CERTIFICATE OF CORRECTION

PATENT NO. : 4,456,957
DATED      : June 26, 1984
INVENTOR(S) : Steven W. Schieltz It is certified that error appears in the above—identified patent and that said Letters Patent is hereby corrected as shown below:

Column 15, line 25 delete "first".

line 27 insert --first-- after the word said.

line 28 delete "also".

line 29 insert --also-- after the word for.

Column 16, line 12 delete "first".

line 13 insert --first-- after the word a (first occurrence).

line 15 delete "also".

Signed and Sealed this

Eighth Day of January 1985

[SEAL]

*Attest:*

*Attesting Officer*

GERALD J. MOSSINGHOFF

*Commissioner of Patents and Trademarks*